United States Patent
Hutar et al.

(10) Patent No.: US 11,585,053 B1
(45) Date of Patent: Feb. 21, 2023

(54) MILLING MACHINE WITH DRUM BEARING ASSEMBLY

(71) Applicant: Caterpillar Paving Products Inc., Brooklyn Park, MN (US)

(72) Inventors: Ryan S. Hutar, Plymouth, MN (US); Craig T. Hedstrom, Mounds View, MN (US); Nicholas B. Johnson, Dayton, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 17/500,573

(22) Filed: Oct. 13, 2021

(51) Int. Cl.
| | |
|---|---|
| *E01C 23/088* | (2006.01) |
| *E01C 23/12* | (2006.01) |
| *F16C 23/08* | (2006.01) |
| *F16C 17/02* | (2006.01) |

(52) U.S. Cl.
CPC .......... *E01C 23/088* (2013.01); *E01C 23/127* (2013.01); *F16C 17/02* (2013.01); *F16C 23/08* (2013.01)

(58) Field of Classification Search
CPC .......... F16C 25/00; F16C 17/02; F16C 23/00; F16C 23/06; F16C 23/08; F16C 25/06; F16C 25/08; F16C 29/12; F16C 29/126; F16C 35/045; E01C 23/088; E01C 23/127
See application file for complete search history.

(56) References Cited

U.S. PATENT DOCUMENTS

| | | | | |
|---|---|---|---|---|
| 2,027,685 | A | * | 1/1936 | Flynn ..................... E01C 23/14 37/413 |
| 3,771,831 | A | * | 11/1973 | Hatcher ................ E01C 23/088 384/157 |
| 6,877,818 | B1 | * | 4/2005 | Gaertner ............... E01C 23/088 404/90 |
| 7,901,011 | B2 | | 3/2011 | Holl et al. |
| 8,714,660 | B2 | | 5/2014 | Rodel et al. |
| 9,234,320 | B2 | | 1/2016 | Abresch et al. |
| 10,519,613 | B2 | | 12/2019 | Steeg et al. |
| 10,533,705 | B2 | | 1/2020 | Lubischer et al. |
| 10,724,187 | B2 | | 7/2020 | Berning et al. |
| 10,724,188 | B2 | | 7/2020 | Berning et al. |

(Continued)

FOREIGN PATENT DOCUMENTS

| | | |
|---|---|---|
| CN | 110904800 A | 3/2020 |
| DE | 102004025567 A1 | 10/2005 |

(Continued)

*Primary Examiner* — Abby J Flynn
*Assistant Examiner* — Michael A Goodwin
(74) *Attorney, Agent, or Firm* — Leydig, Voit & Mayer, LTD.

(57) ABSTRACT

A mobile milling machine includes a cutting rotor disposed along a rotor drum delineating a drum rotation axis and accommodated in a rotor chamber delineated by chamber enclosure. To rotatably support the rotor drum with respect to the chamber enclosure, the rotor drum can include a bearing end and the chamber enclosure can include a bearing bore that are adapted to form a drum bearing assembly. The drum bearing assembly may include a bearing hub and a bushing configured to make a sliding frictional contact along complementary taper surfaces. The floating bushing may be floatingly retained in a chamber door of the chamber enclosure.

14 Claims, 7 Drawing Sheets

(56) References Cited

U.S. PATENT DOCUMENTS

| | | | |
|---|---|---|---|
| 2005/0187062 A1* | 8/2005 | Joki | F16H 57/021 |
| | | | 475/230 |
| 2008/0264658 A1* | 10/2008 | Beller | E02F 3/20 |
| | | | 172/518 |
| 2018/0135257 A1 | 5/2018 | Schlenker et al. | |
| 2018/0328174 A1 | 11/2018 | Magee et al. | |
| 2019/0301111 A1 | 10/2019 | Hirman et al. | |
| 2020/0407927 A1* | 12/2020 | Berning | E01C 23/127 |
| 2021/0017721 A1 | 1/2021 | Mannebach et al. | |

FOREIGN PATENT DOCUMENTS

| | | |
|---|---|---|
| DE | 102020105391 B3 | 3/2021 |
| EP | 2350391 B1 | 1/2018 |
| EP | 3406797 A1 | 11/2018 |
| EP | 3406796 B1 | 10/2019 |
| EP | 3406798 B1 | 11/2019 |

* cited by examiner

MILLING MACHINE WITH DRUM BEARING ASSEMBLY

TECHNICAL FIELD

This patent disclosure relates generally to a mobile machine for milling a work surface such as a road planer or rotary mixer equipped with a cutting rotor accommodated in a rotor chamber and, more particularly, to a drum bearing assembly facilitating disassembly, removal, and replacement of the cutting rotor from the rotor chamber.

BACKGROUND

Mobile milling machines may be utilized for fragmenting and removing materials such as pavement, asphalt, concrete or the like from a roadway or similar paved surfaces. One example of a mobile milling machine is a cold planer or road planer that moves over the work surface and that is equipped with a cutting rotor or milling rotor that can be made to rotate with respect to and against the work surface. The cutting rotor includes a cylindrical rotor drum and a plurality of cutting tools disposed about the exterior of the rotor drum. The cutting tools can penetrate the work surface to fragment and fracture the material thereon. In a road planer, the fractured materials are directed to a conveyor disposed on the machine for removal of the materials from the work surface, for example, by delivering the materials to a hauling truck operating in cooperation with the road planer. A rotary mixer is another example of a mobile milling machine having a cutting rotor to penetrate and fragment paved materials. In the example of a rotary mixer, the fragmented materials are typically left on the work surface and can be reused as aggregate in a subsequent paving operation.

To contain the fragmented materials created during the milling process and prevent the materials from dispersing about the worksite, the cutting rotor may be accommodated in a rotor chamber defined by a chamber enclosure. The cutting rotor can be mounted within and rotatable with respect to the chamber enclosure by various suitable bearing arrangements and assemblies. Occasionally, it may be desirable to remove the cutting rotor from the rotor chamber and replace it with another cutting rotor, for example, a cutting rotor with a different pitch or arrangement of cutting tools. The bearing arrangements may be designed to facilitate removal and replacement of the cutting rotor.

For example, U.S. Pat. No. 8,714,660 ("the '660 patent, assigned to the assignees of the present disclosure) describes a rotor chamber with a cutting rotor mounted transversely between the side plates of chamber enclosure. The '660 patent also describes a bearing configuration in which the cutting rotor can be journaled with respect to one of the side doors. The '660 patent further describes a bearing support that can removably coupled the cutting rotor to the side door with a plurality of fastening elements. The present disclosure is also directed to bearing configuration adapted to removably mount a cutting rotor within a chamber enclosure to facilitate removal and exchange of different cutting rotors.

SUMMARY

The disclosure describes, in one aspect, a mobile milling machine including a machine frame supported on a plurality of propulsion devices for travel over a work surface in a travel direction. The machine frame defines a first lateral side and a second lateral side that are parallel with the travel direction. To mill the work surface, a cutting rotor is rotatably supported by the machine frame. The cutting rotor includes a rotor drum that is cylindrical in shape and a plurality of cutting tools disposed exteriorly about the rotor drum. The rotor drum includes a drum axle that traverses between the first lateral side and the second lateral side of the machine frame and that defines a drum rotational axis that is perpendicular to the travel direction. The drum axle may include a bearing end proximate the first lateral side of the machine frame. To enclose the cutting rotor, a rotor chamber including a chamber enclosure is mounted to the machine frame. The chamber enclosure includes a chamber door aligned with the first lateral side of the machine frame and that has a bearing bore disposed therein to receive the bearing end of the drum axle. The bearing bore and bearing end can form drum bearing assembly including a bearing hub disposed on the bearing end of the drum axle and a bushing disposed in the bearing bore of the chamber door. The bearing hub and the bushing are configured to make a sliding frictional interface with each other along complementary taper surfaces.

In another aspect, the disclosure describes a mobile milling machine having a machine frame supported on a plurality of propulsion devices for travel over a work surface in a travel direction. The machine frame defines a first lateral side and a second lateral side that are parallel to the travel direction. To mill the work surface, a cutting rotor is rotatably supported by the machine frame. The cutting rotor includes a rotor drum that is cylindrical in shape and a plurality of cutting tools disposed exteriorly about the rotor drum. The rotor drum includes a drum axle that traverses between the first lateral side and the second lateral side of the machine frame and that defines a drum rotational axis that is perpendicular to the travel direction. The drum axle may include a bearing end proximate the first lateral side of the machine frame.

To enclose the cutting rotor, a rotor chamber including a chamber enclosure is mounted to the machine frame. The chamber enclosure includes a chamber door aligned with the first lateral side of the machine frame and that has a bearing bore disposed therein to receive the bearing end of the drum axle. The drum bearing assembly includes a bearing hub disposed on the bearing end of the drum axle and a floating bushing disposed in the bearing bore of the chamber door. The floating bushing is retained in a bushing cavity disposed in the chamber door and is allowed limited axial movement with respect to the drum rotational axis.

In yet another aspect of the disclosure, there is described a drum bearing assembly that releasably connects a rotor drum to a chamber enclosure on a mobile milling machine. The drum bushing assembly includes a chamber door of the chamber enclosure that has a bearing bore disposed and a floating bushing retained in a bushing cavity disposed in the chamber door and accessible to the bearing bore. The floating bearing is constrained by the bushing cavity to limited axial movement. The drum bearing assembly also includes a drum axle that defines a drum rotational axis. The drum axle has a bearing end configured to extend partially into the bearing bore of the chamber door. Disposed on the bearing end of the drum axle is a bearing hub configured to make a sliding frictional interface with the floating bushing along complementary tapered surfaces.

DETAILED DESCRIPTION

Figure 1:
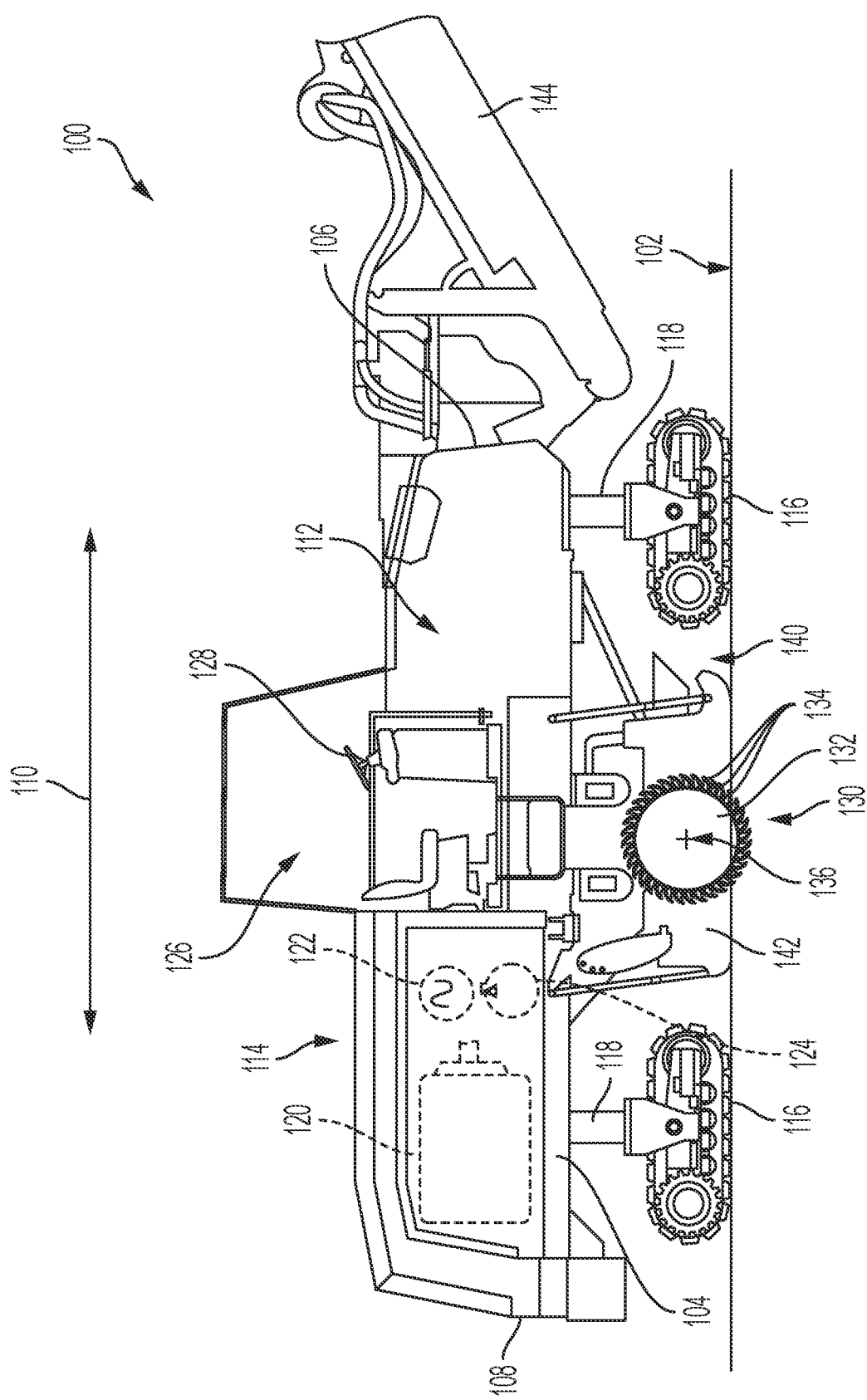
FIG. 1 is a side elevational view of a mobile milling machine for milling a work surface that is equipped with a cutting rotor accommodated in a rotor chamber delineated by a chamber enclosure.

Now referring to the drawings, wherein whenever possible like reference numbers refer to like features, there is illustrated in FIG. 1 a mobile milling machine 100 that may be used in road repair and repaving operation. The illustrated mobile milling machine 100 can be in the form of a cold planer or road planer that can mill and remove a layer of the work surface 102 by penetrating into and fracturing the work surface in a milling operation. However, aspects of the disclosure are applicable to other types of milling machines such as rotary mixers configured to fragment and reclaim or reuse a layer of the work surface 102 in a subsequent construction or agricultural operation, for example, by leaving the fragmented materials as a base aggregate over the work surface for a subsequent paving operation.

The mobile milling machine 100 can include a machine frame 104 that can be oriented with a forward end 106 and a rearward end 108 that are aligned with a travel direction 110 of the machine. The travel direction 110 may correspond to the bearing or heading of the mobile milling machine 100 when traveling over the work surface 102. It should be noted, however, that the mobile milling machine 100 may conduct milling operations in either the forward or reverse directions and that the terms "forward end" and "rearward end" are used primarily for reference purposes. The machine frame 104 may also include a first lateral side 112 and an opposite second lateral side 114, which, depending upon the orientation of the observer, may correspond to the left hand side or the right hand side of the rotary mixer 100. The first and second lateral sides 112, 114 can be aligned parallel with the travel direction 110 of the mobile milling machine 100.

To support the mobile milling machine 100 on the work surface 102, the machine frame 104 can be supported on a plurality of propulsion devices 116. In the illustrated embodiment, the propulsion devices 116 can be a plurality of continuous tracks or crawler tracks disposed approximately at each corner of the machine frame 104 where the forward end 106 and rearward end 108 intersect the first and second lateral sides 112, 114. The continuous tracks may include a closed belt disposed about rollers and/or sprockets where translation of the belt carries the mobile milling machine 100 over the work surface 102. Another suitable example of propulsion devices includes rotatable wheels with rubber pneumatic tires that can be driven to rotate with respect to the work surface 102.

To vertically raise and lower the rotary mixer 100 with respect to the work surface 102, the machine frame 104 can be coupled to the propulsion components 116 by a plurality of lifting columns 118. The telescopic lifting columns 118 can independently extend and retract to adjust the height, grade, and slope of the machine frame 104 relative to the work surface 102. In an embodiment, the lifting columns 118 can be located at the forward end 106 and at the rearward end 108 toward either lateral side 112, 114 so that the pitch, slope, and/or grade of the rotary mixer 100 can be selectively altered.

To power the propulsion devices 116, lifting columns 118, and other systems of the rotary mixer 100, a power source such as an internal combustion engine 120 can be disposed on the machine frame 104. The internal combustion engine 120 can burn a hydrocarbon-based fuel like diesel or gasoline and convert the latent chemical energy therein to a mechanical motive force in the form of rotary motion that can be harnessed for other useful work. The rotary output of the engine 120 can be transmitted through a crankshaft extending from the engine and operatively coupled to the propulsion devices 116 and other systems. For example, the engine 120 can be operatively coupled to and drive other power systems on the rotary mixer such as an electrical generator 122 to generate electricity for an electrical system and a hydraulic pump 124 for pressurizing and directing hydraulic fluid for a hydraulic system.

To accommodate an operator, the mobile milling machine 100 can include an onboard operator cab or operator station 126 on the machine frame 104 at a location that provides visibility over and about the work surface 102 for conducting the milling operation. The operator station 126 can include various operator controls, readouts, and other input/output interfaces for monitoring and controlling operation of the rotary mixer 100. For example, the operator station 126 can include a steering wheel 128 or steering joysticks for adjusting the travel direction 110 of the mobile milling machine 100, speed controls for adjusting the travel speed of the rotary mixer 100, and elevation controls for adjusting the vertical distance between the machine frame 104 and the work surface 102 via the lifting columns 118. In other embodiments, the mobile milling machine 100 may be configured for remote operation and some or all of the foregoing operator controls may be located remotely from the onboard operator station 126.

To engage and fragment the work surface 102, the mobile milling machine 100 can include a power driven cutting rotor 130 rotatably supported by the machine frame 104. The cutting rotor 130 can includes a cylindrical shaped shell or rotor drum 132 with a plurality of picks or teeth-like cutting tools 134 disposed about the cylindrical exterior surface of the rotor drum 132. In some embodiments, the cutting tools 134 may be removable from the cutting rotor 130 for replacement as they become worn or damaged. The rotor drum 132 is oriented on the mobile milling machine 100 so that drum rotational axis 136 about which the cutting rotor 130 rotates is normal, i.e., perpendicular to the travel direction 110. The drum rotational axis 136 can extend between and traverses the first and second lateral sides 112, 114 of the machine frame 104. As the cutting rotor 130 rotates, the cutting tools 134 impact and penetrate into the work surface 102 fracturing the material thereof. The cutting tools 134 are adapted to penetrate into the work surface 102 and remove a portion of the material as the mobile milling machine 100 advances along the travel direction 110 through a process referred to as milling or planning.

To contain the fragmented materials and debris, the cutting rotor 130 can be rotatably accommodated and enclosed in a rotor chamber 140 located on the mobile milling machine 100. The rotor chamber 140 may be an opened space delineated by a chamber enclosure 142 that extends from the machine frame 104 toward the work surface 102. The rotor chamber 140 and chamber enclosure 142 can be located approximately mid-length on the machine frame 104 between the forward end 106 and the rearward end 108 so that the machine weight can be disposed on the cutting rotor 130 to maintain a uniform cut depth.

In embodiments where the mobile milling machine 100 is configured as a road planer, the rotor chamber 140 can be operatively associated with and in communication with a conveyor 144 disposed on the forward end 106 of the machine frame 104 and directed forwardly there from. During a milling operation, the distal end of the conveyor 144 can be disposed over the bed of a haul truck and fragmented materials and debris can be directed from the rotor chamber 140 to the haul truck. In the embodiments where the mobile milling machine 100 is used in a work surface reclamation process, the rotor chamber 140 can function as a mixing chamber that can be operatively associated with other systems to receive water or other materials for mixing with the fragmented debris. When the cutting rotor 130 rotates in the chamber enclosure 142, the rotation mixes the fragments and materials that can be redeposited on the work surface 102.

Figure 2:
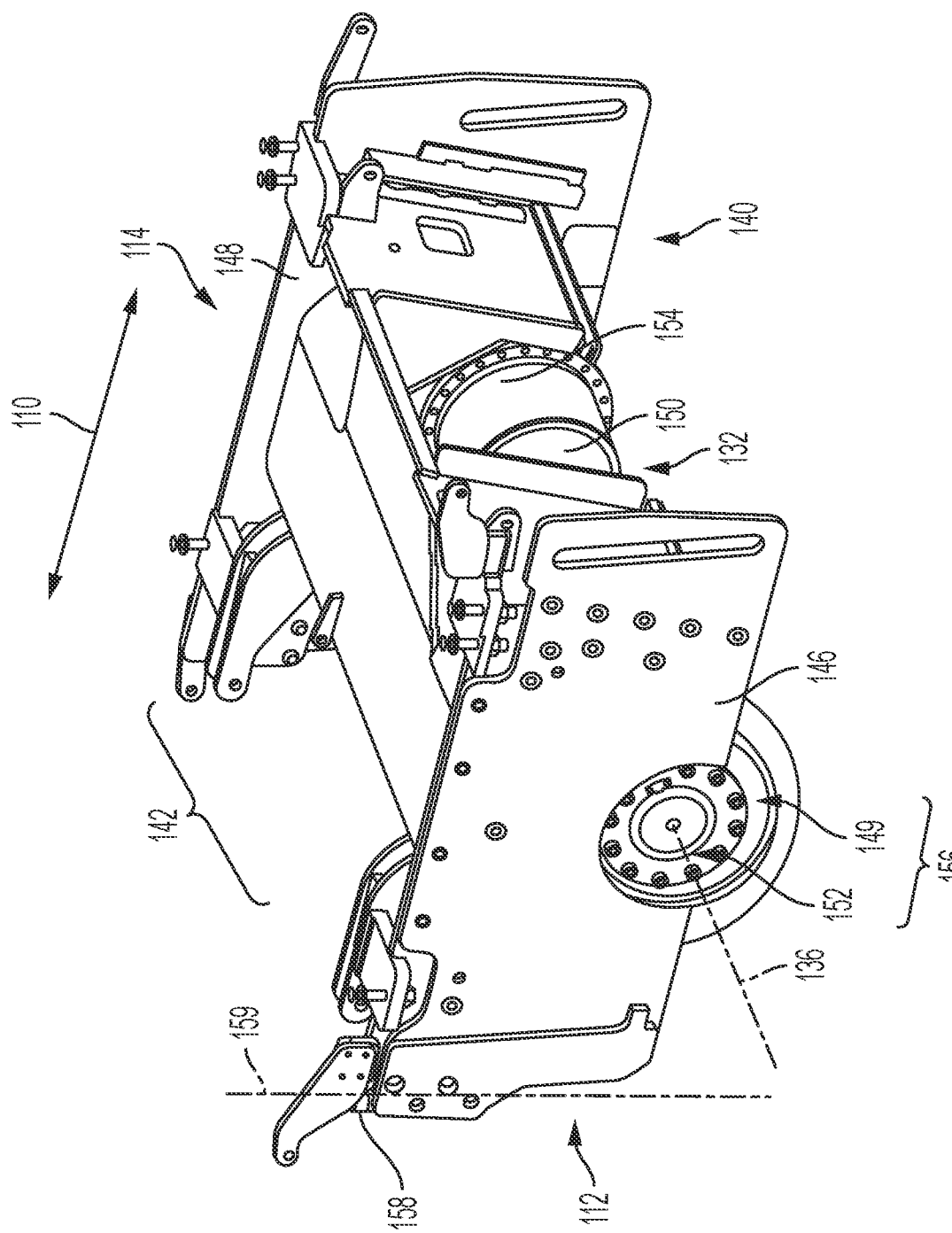
FIG. 2 is a perspective view of the chamber enclosure with a drum axle of the rotor drum traversely supported between first and second side panels of the chamber enclosure.

Referring to FIG. 2, to delineate the rotor chamber 140, the chamber enclosure 142 can be formed as a box-like structure with several orthogonally arranged panels. These may include a first side panel 146 and an oppositely located second side panel 148 that may be made from rigid structural steel plates or the like. The first side panel 146 may align with the first lateral side 112 of the machine frame and the second side panel 148 may align with the second lateral side 114 of the machine frame. The first and second side panels 146, 148 may be statically connected with machine frame so that the chamber enclosure 142 is typically stationary and held in a fixed relationship with respect to the machine frame.

The rotor drum 132 includes an elongated drum axle 150 that can be the centermost shaft or rotational component about which the cutting rotor 130 is assembled and is caused to rotate. The drum axle 150 defines the centerline of the rotor drum 132 and the drum rotational axis 136. The drum axle 150 can be an integral solid component to resist axial bending moments that may be imparted to the rotor drum 132 or may be assembled from a plurality of axially aligned segments joined securely together. The drum axle 150 extends traversely between and rotatably engages with the first and second side panels 146, 148. In an embodiment, the drum axle 150 can extend between a first axle end referred to as the bearing end 152 and a second axle end referred to as the drive end 154. The bearing end 152 can be rotatably connected to and supported by the first side panel 146 and the drive end 154 can be rotatably connect to and supported by the second side panel 148.

To connect with the bearing end 152, the first side panel 146 may include a bearing bore 149 disposed through the plane of the first side panel. The bearing bore 149 can partly receive and interact with the bearing end 152 and the two features may include components of a drum bearing assembly 156 to constrain the axial and radial movement of the rotor drum 132 while allowing the rotor drum to rotate with respect to the drum rotational axis 136. When the bearing end 152 and first side panel 146 are rotatably connected, the bearing bore 149 is indexed into axial alignment with the drum rotational axis 136. In an embodiment, the drive end 154 of the drum axle 150 can be operatively associated with and driven by belt drives, chain drives, transmissions and other assemblies and components for transmitting a motive force to power rotation of the rotor drum 132 about the drum rotational axis 136.

As stated above, it may be desirable to replace the cutting rotor on the mobile milling machine, for example, to provide different patterns of the cutting tools or different designs of the cutting tools dependent upon the material to be milled. To disassemble and remove the rotor drum 132 from the chamber enclosure 142, the drum bearing assembly 156 formed between the bearing end 152 of the drum axle 150 and the bearing bore 149 in the first side panel 146 can adapted to release the drum axle 150 from physical engagement with the side panel. After the bearing end 152 is physically released from the first side panel 146, the drive end 154 of the drum axle 150 can be released from the second side panel 148 and the drum axle 150 and cutting rotor 130 thereon can be removed from the rotor chamber 140.

In an embodiment, to physically separate the first side panel 146 and the bearing end 152 of the drum axle 150, the first side panel can be configured as a chamber door (as it will be referred to hereinafter) that is pivotally connected to the machine frame and adapted to swing open and provide access to the interior of the rotor chamber 140. A chamber door hinge 158 can be disposed along an edge of the chamber door 146 that meets a corresponding edge of the machine frame which, in the illustrated embodiment, may be located vertically along the first lateral side 112 associated with the machine frame and the chamber enclosure 142. The chamber door hinge 158 can define a hinge axis 159 that is perpendicular to both drum rotational axis 136 and the travel direction 110 of the mobile milling machine 100. When the chamber door 146 is pivoted with respect to the machine frame 104 by the chamber door hinge 158, the chamber door swings away from and becomes separated with respect to the bearing end 152 of the drum axle 150.

Figure 3:
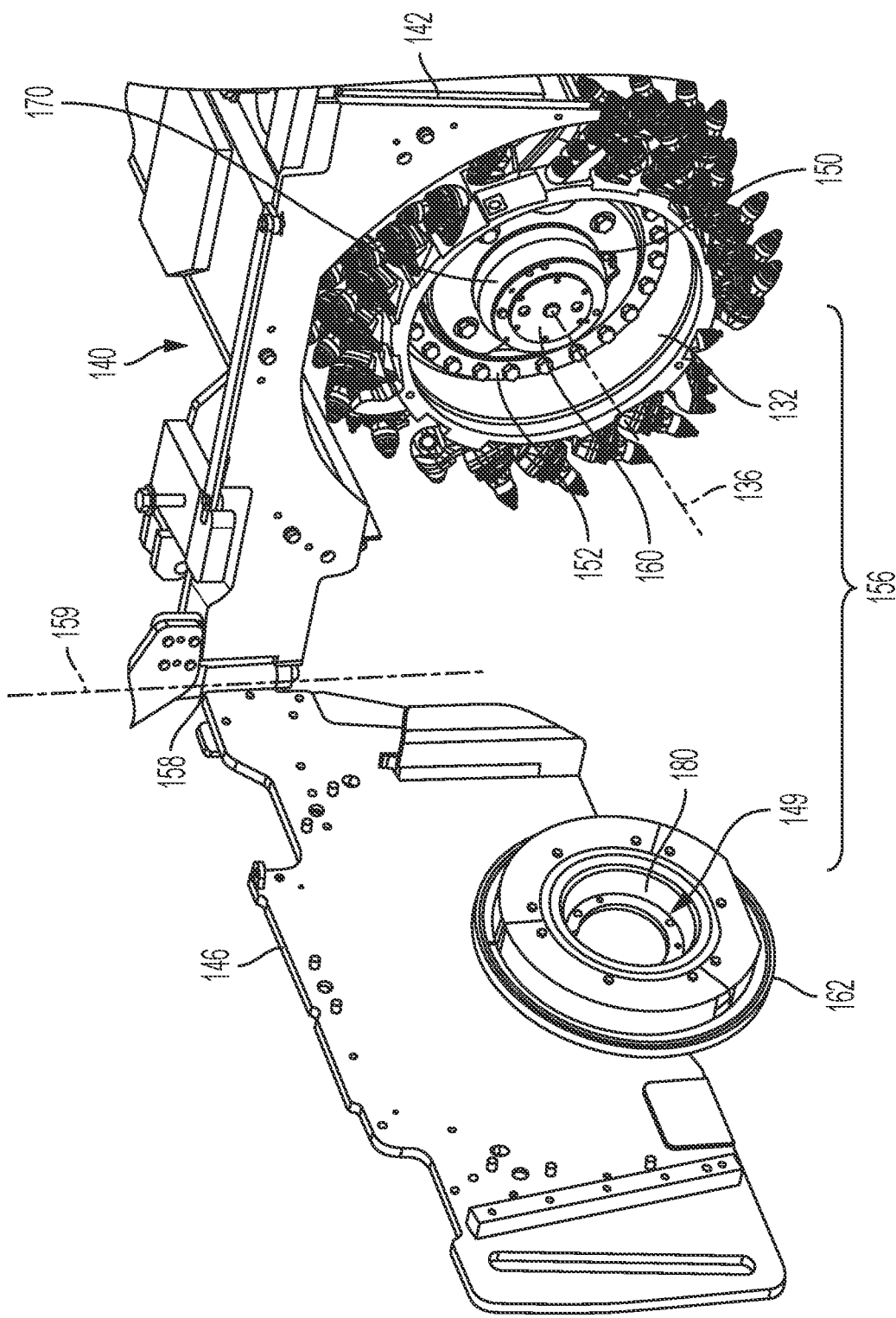
FIG. 3 is a perspective view of the chamber enclosure with the chamber door pivotally swung open to access the cutting rotor and illustrating the drum bearing assembly including the arrangement of a floating bushing in the chamber door and a bearing hub fitted to the axle stem of the cutting rotor.

Referring to FIG. 3, when the chamber door 146 of the chamber enclosure 142 is pivoted open about the chamber door hinge 158, the bearing end 152 of the rotor drum 132 is removed and separates from the bearing bore 149 and becomes a free, unsupported end of the drum axle 150. The cutting rotor 130 can thereafter be removed from the rotor chamber 140 by pulling the rotor drum 132 in the axial direction established by the drum rotational axis 136 away from the second side panel located on the opposite side of the chamber enclosure 142. The pivoting chamber door 146 provides unhindered access to the bearing end 152 of the cutting rotor 130 for removal.

As stated above, the bearing bore 149 in the chamber door 146 and the bearing end 152 of the rotor drum 132 can form a drum bearing assembly 156 to radially support the cutting rotor 130 in the rotor chamber 140 while permitting rotation of the rotor drum 132 with respect to the drum rotational axis 136. To form the drum bearing assembly 156, in an embodiment, the bearing end 152 may have an axle stem 160 that protrudes axially outward. The axle stem 160 can be an integral part of the drum axle 150 disposed along the centerline of the rotor drum 132 such that the axle stem aligns with the drum rotational axis 136. The axle stem 160 have a circular exterior shape and be dimensioned to be received in the bearing bore 149 of the chamber door 146.

In an embodiment, the bearing bore 149 can be located within a mounting boss 162 formed on the interior side of the chamber door 146. The mounting boss 162 can be generally circular in shape and can protrude from the planar inner surface of the chamber door 146 that would be interiorly exposed to the rotor chamber 140 when the chamber door is pivoted closed with respect to the hinge axis 159. The mounting boss 162 may provide structural support for engaging with the bearing stem 160 and may provide additional accommodations for the interior elements of the drum bearing assembly 156. In an embodiment, the circular outer shape of the mounting boss 162 may be dimensioned so that the mounting boss can be received in an annular void formed concentrically between the outer cylindrical shell of the rotor drum 132 and the smaller diameter axle stem 160.

Figure 4:
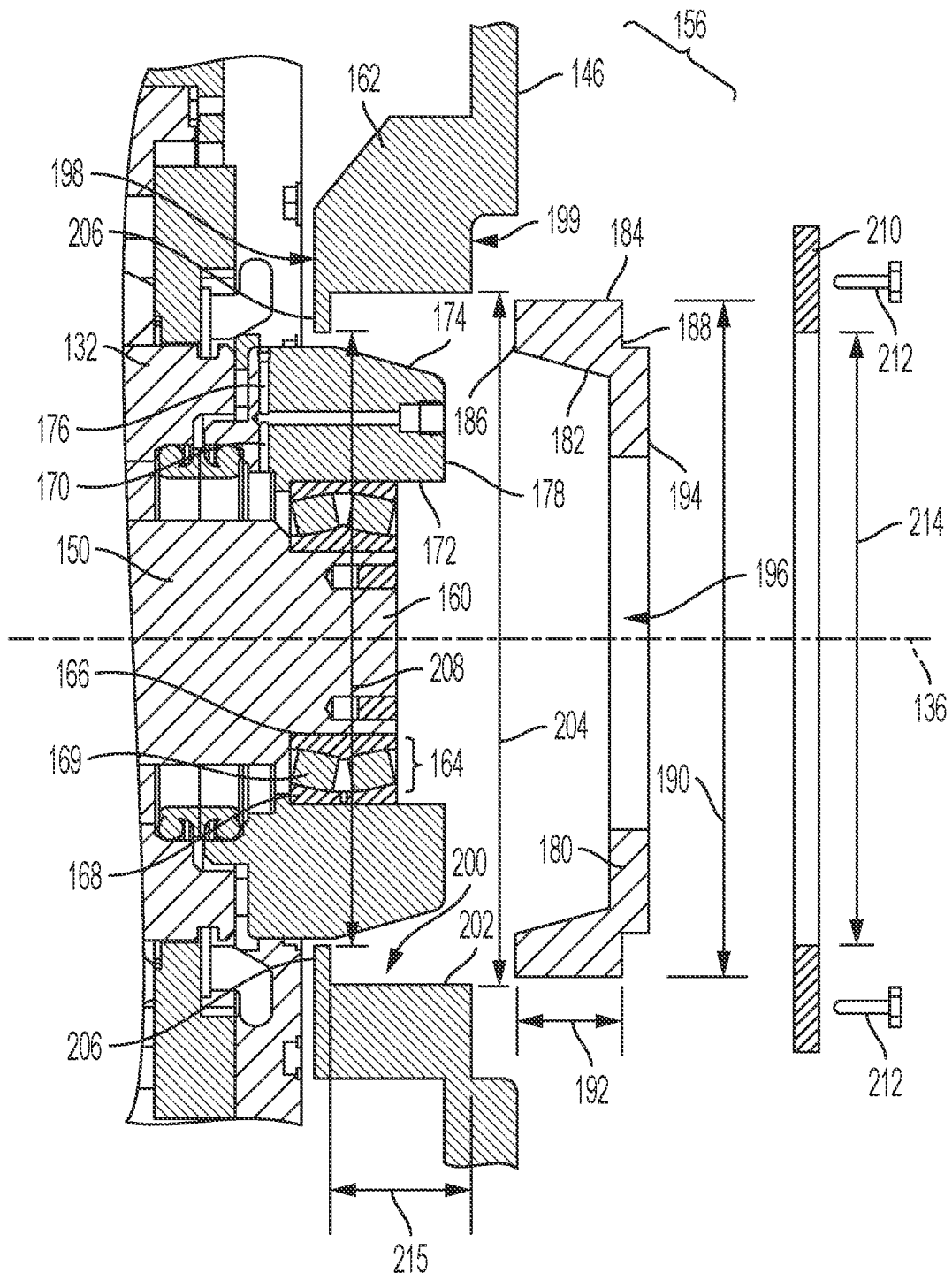
FIG. 4 is a cross-sectional, partial assembly view of the drum bearing assembly illustrating assembly of the floating bushing to the chamber door and separated from the bearing hub on the drum axle.
Figure 5:
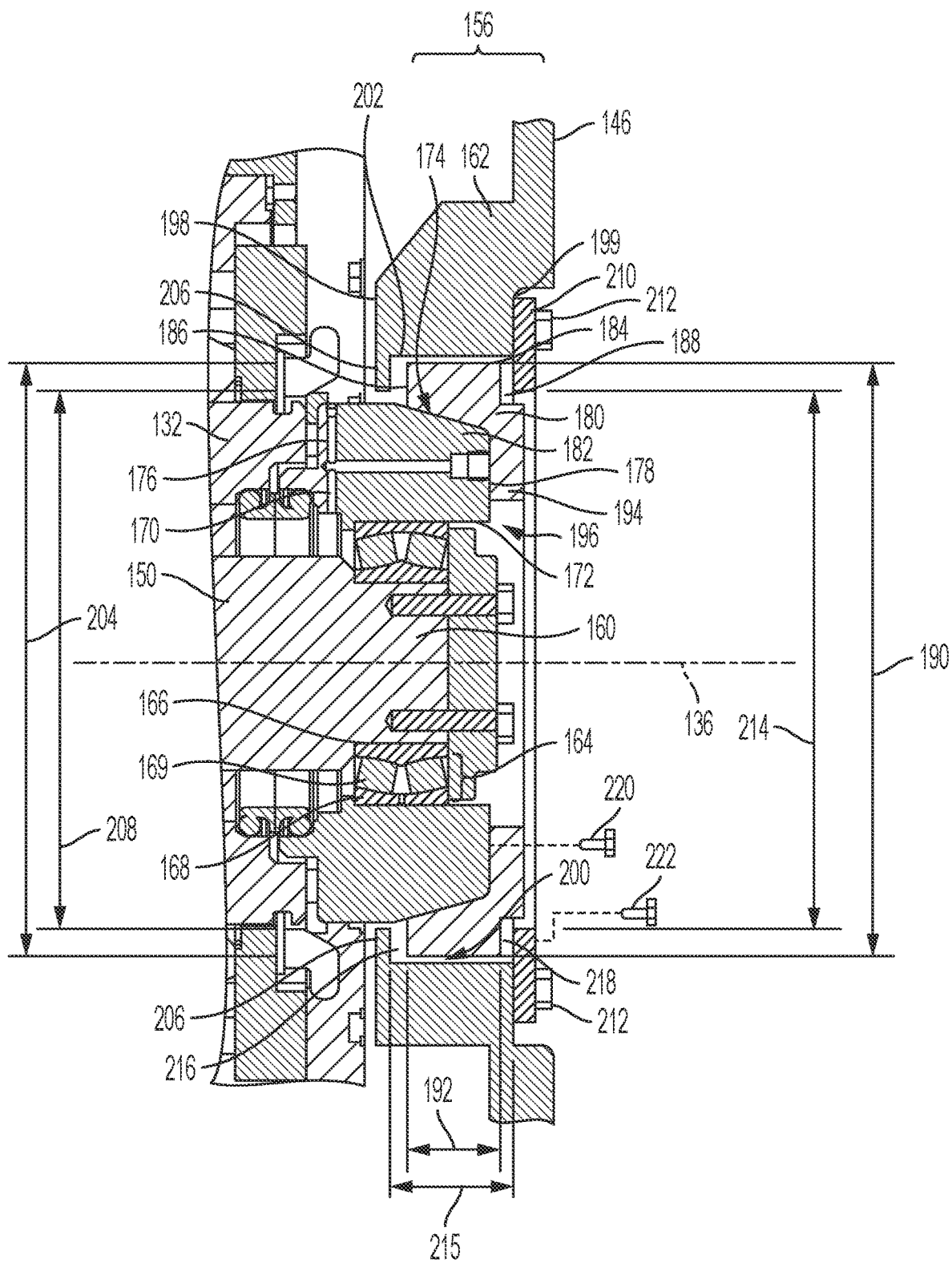
FIG. 5 is a cross-sectional view of the drum bearing assembly illustrating the interface between the floating bushing and the bearing hub when the chamber door is closed and the components interact together.

Referring to FIGS. 4 and 5, the arrangement of and interaction between the interior components of the drum bearing assembly 156 are illustrated. The axle stem 160 integral with the drum axle 150 protrudes a short axial length with respect to the bearing end 152 of the rotor drum 132 and provides the centering structure about which other components can be concentrically aligned with the drum rotational axis 136. Fitted about the circular exterior of the axle stem 160 can be a rolling element bearing 164 that can transfer the loads of the rotor drum 132 to the chamber enclosure 142 while permitting relative rotation of the rotor drum with respect to the chamber enclosure. The rolling element bearing 164 can include an inner race ring 166 press fit to, and thereby rotationally locked with, the distal end of the axle stem 160. The outer race ring 168 of the rolling element bearing 164 is disposed radially outward of and separated from the inner race ring 166 by a plurality of rolling elements 169, such as cylindrical rollers or balls. The rolling elements 169 enable the concentric inner race ring 166 and outer race ring 168 to freely rotate relative to each other and with respect to the drum rotational axis 136.

To physically contact and engage with the components of the drum bearing assembly 156 associated with the chamber door 146 of the chamber enclosure 142, a bearing hub 170 can be disposed about and press fit to the outer race ring 168 of the rolling element bearing 164. The bearing hub 170 is thus fixed and locked into rotation with the outer race ring 168. As can be seen in reference to FIG. 3, to fit about the rolling element bearing 164, the bearing hub 170 may be annular in shape and fit over and fixed to the axle stem 160. The bearing hub 170 can be made from any rigid material suitable for carrying and transferring bearing loads such as steel.

The bearing hub 170 can be uniquely shaped to releasably engage with the complementary components of the drum bearing assembly 156. In an embodiment, the annular shaped bearing hub 170 can include an inner annular surface 172 and an outer annular surface 174 of larger diameter than the inner annular surface. The inner annular surface 172 can be cylindrical in shape and defines a consistent cylindrical inner diameter that corresponds to the cylindrical exterior of the outer race ring 168 to which the bearing hub 170 is press fit. The outer annular surface 174 may be tapered or frustoconical in shape and is angled with respect to the cylindrical inner annular surface 172 of the bearing hub 170. The tapered outer annular surface 174 may taper generally between a first or inner axial hub face 176 oriented proximally toward the rotor drum 132 and an second outer axial hub face 178 oriented distally away from the rotor drum 132. The annular band of the bearing hub 170 thus has a decreasing thickness between the inner axial hub face 176 and the outer axial hub face 178.

To physically contact and engage with the bearing hub 170, a bushing 180 may be disposed within and operatively associated with the chamber door 146. As can be seen in reference to FIG. 3, for installation in the bearing bore 149 disposed in the mounting boss 162, the bushing 180 may also be annular in shape and extends about the inner circumference of the bearing bore 149. The bushing 180 can be made from any rigid material suitable for carrying and transferring bearing loads such as steel.

In an embodiment, the annular shaped bushing 180 may be a floating bushing, as described below, and can have an inner annular surface 182 and an outer annular surface 184 of larger diameter than the inner annular surface. To interface with the tapered outer annular surface 174 of the bearing hub 170, the inner annular surface 182 of the floating bushing 180 can have a complementary tapered shape. The angle of the taper may decrease the inner diameter the tapered inner annular surface 182 as it extends between a first, or inner axial bushing face 186 oriented axially toward the rotor drum 132 and a second, outer axial bushing face 188 oriented axially away from the rotor drum 132.

The tapered inner annular surface 182 of the bushing 180 can be sized and dimensioned to form a sliding or mating fit with the tapered outer annular surface 174 when the bearing hub 170 is received centrally into the annular shape of the bushing 180. The tapered outer annular surface 174 of the bearing hub 170 and the tapered inner annular surface 182 of the bushing 180 can thus abut against each when the tapered shapes are properly seated and form a line of frictional contact through which they are engaged. The frictional contact between the tapered outer annular surface 174 and the tapered inner annular surface 182 may prevent the bearing hub 170 and the floating bushing 180 from slipping with respect to each other when the two components are rotated. Moreover, the tapered shape associated with the tapered outer annular surface 174 and the tapered inner annular surface 182 can cause the floating bushing 180 to index into alignment with the drum rotational axis 136 when the floating bushing is seated onto the bearing hub 170.

The outer annular surface 184 of the bushing 180 may be cylindrical and may have a constant outer bushing diameter, indicated by arrow 190, between the inner axial bushing face 186 and the outer axial bushing face 188. The inner axial bushing face 186 and the outer axial bushing face 188, may further define a bushing width 192, also indicated by an arrow. In an embodiment, to assist the bearing hub 170 with being received into and matingly seated within the bushing 180, the bushing can include an annular flange 194 formed along the outer axial bushing face 188. The annular flange 194 can protrude radially inwards with respect the tapered inner annular surface 182 of the bushing 180 and can define a central opening 196. When the tapered outer annular surface 174 and the tapered inner annular surface 182 make sliding contact and seat together, the annular flange 194 of the bushing 180 can abut against the outer axial hub face 178 of the bearing hub 170.

In embodiments where the bushing 180 may float, the floating bushing 180 can be loosely retained in the bearing bore 149 disposed in mounting boss 162 formed on the interior of the chamber door 146. The mounting boss 162 may include an inner axial boss face 198 normal to the drum rotational axis 136 and oriented axially toward the rotor drum 132 and an outer axial boss face 199 normal to the drum rotational axis 136 and oriented axially away from the rotor drum 132. To accommodate the floating bushing 180, the chamber door 146 can have disposed therein a bushing cavity 200 that defines a void into which the bushing 180 may be located. The bushing cavity 200 can be continuation of the void provided by the bearing bore 149 disposed in the chamber door 146. The bushing cavity 200 can be a raceway or the like disposed radially into the material of the mounting boss 162 that concentrically surrounds the bearing bore 149 in the chamber door 146. The bushing cavity 200 can be circular in shape so that the floating bushing 180 can be concentrically received in the bushing cavity 200.

The bushing cavity 200 defines a cavity periphery 202 that is parallel to and concentrically disposed around the drum rotational axis 136. The cavity periphery 202 faces opposite to the cylindrical outer annular surface 184 of the floating bushing 180. In an embodiment, the inner cavity diameter 204 associated with the cavity periphery 202 can be slightly larger than the outer bushing diameter 190 associated with the cylindrical outer annular surface 184 of the floating bushing 180 so that the cylindrical outer annular surface 184 and the cavity periphery 202 do not directly contact each other. Accordingly, the floating bushing 180 forms a clearance fit with the bushing cavity 200 and is clear to rotate or spin within the raceway provided by the bushing cavity 200 and the floating bushing 180 is thus floating.

To retain the floating bushing 180, the mounting boss 162 can include shoulder flange 206 formed at the inner axial boss face 198 of the mounting boss 162. For example, the shoulder flange 206 can be located proximate the inner axial boss face 198 where the bearing bore 149 is disposed through and opens through the mounting boss 162. The shoulder flange 206 may extend radially inward with respect to the cavity periphery 202 and may therefore define an inner flange diameter 208 that is smaller than the outer bushing diameter 190 associated with the cylindrical outer annular surface 184 of the floating bushing 180. The shoulder flange 206 can therefore block axial movement of the floating bushing 180 inward with respect to the drum rotational axis 136 in the event the floating bushing is not matingly seated with the bearing hub 170 because the inner axial bushing face 186 will abut the shoulder flange 206.

To prevent the floating bushing 180 from moving axially outward of the bushing cavity 200, a bushing cover plate 210 can be mounted to the outer axial boss face 199 of the mounting boss 162. The bushing cover plate 210 can be a thin, annular ring or disk with a rectangular cross section, although other shapes are contemplated based on the contour of the outer axial boss face 199. The bushing cover plate 210 can be mounted to the outer axial boss face 199 by a plurality of threaded fasteners 212.

The bushing cover plate 210 can have an inner plate diameter 214 and a larger outer plate diameter. The inner plate diameter 214 may be smaller than the inner cavity diameter 204 defined by the cavity periphery 202 so that the inner plate diameter 214 is disposed radially inwards of the cavity periphery. Hence, when the bushing cover plate 210 is mounted to the outer axial boss face 199 of the mounting boss 162, the floating bushing 180 is prevented from axially backing outward of the bushing cavity 200 because the outer axial bushing face 188 may abut the bushing cover plate 210.

The distance between the shoulder flange 206 and the bushing cover plate 210 can delineate a cavity width 215 associated with the bushing cavity 200. The cavity width 215 can be larger in dimension than the bushing width 192 defined between the inner axial bushing face 186 and the outer axial bushing face 188 of the floating bushing 180. In other words, the cavity width 215 is larger than the bushing width 192. The difference between the cavity width 215 and the bushing width 192 may result in the formation of a first set of cavity gaps 216 between the shoulder flange 206 and the inner axial bushing face 186 and a second set of cavity gaps 218 between the outer axial bushing face 188 and the bushing cover plate 210.

The presence of the first and second sets of cavity gaps 216, 218 created between the shoulder flange 206 and the inner axial bushing face 186 and the bushing cover plate 210 and the outer axial bushing face 188 allow the floating bushing to axially float as a free body within the bushing cavity 200. The difference between the bushing width 192 and the cavity width 215 enables the floating bushing 180 to axially move with respect to the drum rotational axis 136 within the bushing cavity 200 while the shoulder flange 206 and the bushing cover plate 210 restrain the floating bushing 180 in the bushing cavity 200 disposed in the mounting boss 162. The floating bushing 180 is loosely retained in the chamber door 146 concentrically with the bearing bore 149 and can undertake a limited range of axial motion with respect to the chamber door 146 and with respect to the axle stem 160 and the components of the drum bearing assembly 156 mounted thereon.

INDUSTRIAL APPLICABILITY

The disclosed drum bearing assembly 156 facilitates the installation and removal of a cutting rotor 130 in the rotor chamber 140 of a mobile milling machine 100. The disclosed drum bearing assembly 156 includes at least a bearing hub 170 and a bushing 180 having complementary tapered surfaces that facilitate assembly and disassembly of the drum bearing assembly, it should be appreciated that while specific orientations of the tapered surface have been described with respect to the bearing hub or the bushing, the orientations of the tapered surfaces may be changed or reversed in keeping with the disclosure.

Referring to FIGS. 4 and 5, the floating bushing 180 may be assembled as part of the chamber door 146 and retained therein. For example, the floating bushing 180 may be axially inserted into the bearing cavity 200 disposed in the mounting boss 162 from the side of the outer axial boss face 199 with the inner axial bushing face 186, and thus the taper, oriented axially inward with respect to the drum rotational axis 136. The cylindrical outer annular surface 184 of the floating bushing 180 and the complementary cylindrical shape of the cavity periphery 202 facilities sliding insertion of the floating bushing 180 into the bushing cavity 200. Because the outer bushing diameter 190 of the cylindrical outer annular surface 184 is smaller than the inner cavity diameter 204 of the cavity periphery 202, the floating bushing 180 forms clearance fit with and may rotate within the bushing cavity 200.

To retain the floating bearing 180 in the bushing cavity 200, the bushing cover plate 210 can be mounted to the outer axial boss face 199 with the plurality of threaded fasteners 212. Because the inner plate diameter 214 is smaller than the inner cavity diameter 204, the inner annular circumference of the bushing cover plate 210 extends radially inward with respect to the cavity periphery 202 and the floating bushing 180 is thus trapped and axially constrained between the shoulder flange 206 and the bushing cover plate 210. However, because of the size difference between the bushing width 192 and the larger cavity width 215, the first and second set of cavity gaps 216, 218 form between the inner axial bushing face 186 and the shoulder flange 206 and between the outer axial bushing face 188 and the bushing cover plate 210 respectively. The first and second sets of cavity gaps 216, 218 allow limited axial movement of the floating bushing 180 within the bushing cavity 200 of the mounting boss 162.

When the chamber door 146 is pivoted closed with respect to the bearing end 152 of the rotor drum 132, the floating bushing 180 will interface with the bearing hub 170 disposed on the axle stem 160. For example, the tapered inner annular surface 182 of the floating bushing 180 may make sliding contact with the tapper outer annular surface 174 of the bearing hub 170 in the axial direction established by the drum rotational axis 136 until the two components are properly seated. When the bearing hub 170 is received in the floating bushing 180, the two components may be rotationally locked together due to frictional contact between the interfaced tapered outer annular surface 174 of the bearing hub and the tapered inner annular surface 182 of the floating bushing.

In an embodiment shown in FIG. 5, to ensure the bearing hub 170 and the floating bushing 180 maintain frictional contact between the interfaced tapered outer annular surface 174 and the tapered inner annular surface 182, a first plurality of threaded pulling fasteners 220 can be inserted through appropriately located holes in the floating bushing 180 and threadably engaged into the bearing hub 170. Tightening the threaded pulling fasteners 220 moves the floating bushing 180 axially inward and toward the shoulder flange 206 thereby collapsing the first set of cavity gaps 216. The imparted friction along the line of contact between the tapered outer annular surface 174 and the tapered inner annular surface 182, as well as the presence of the first plurality of threaded pulling fasteners 220, will rotationally lock the bearing hub 170 and the floating bushing 180 together.

Moreover, the seated bearing hub 170 and the floating bushing 180 may be radially constrained by the presence of the floating bushing in the bushing cavity 200. Accordingly, when the drum axle 150 of the rotor drum 132 rotates with respect to the drum rotational axis 136, the inner race ring 166 that is force fit onto the axle stem 160 rotates relative to the outer race ring 168 allowing the bearing hub 170 and the floating bushing 180 to remain rotationally stationary. The radially loads arising from the rotating rotor drum 132 are transferred through the rolling element bearing 164 as intended.

Figure 6:
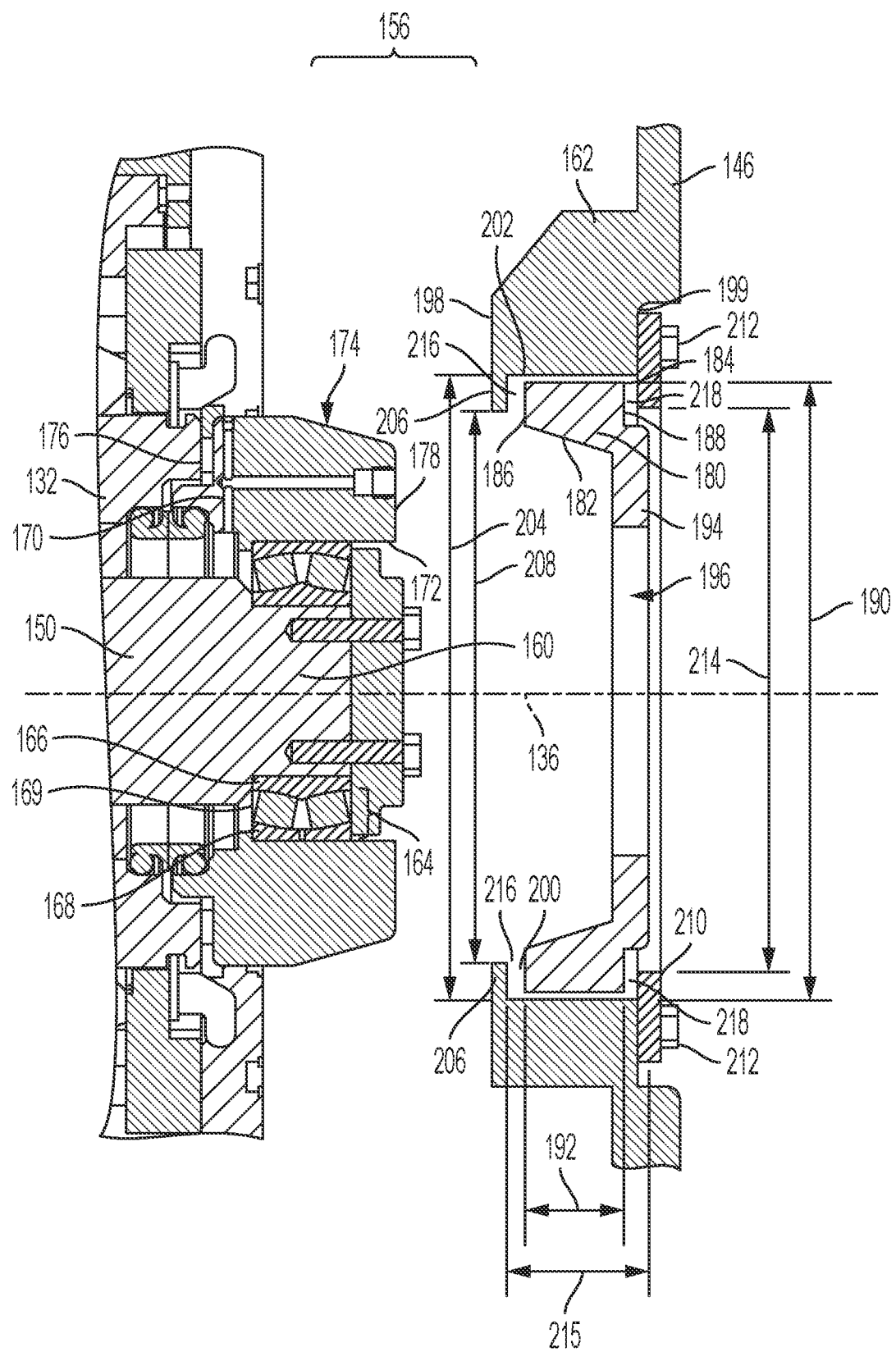
FIG. 6 is a cross-sectional view of the drum bearing assembly illustrating the floating bushing and the bearing hub when the chamber door is opened and the components are separated.

The arrangement of the components of the drum bearing assembly 156 simplifies removal the cutting rotor 130 from the rotor chamber 140 when desired. To disengage the components of the drum bearing assembly 156, the chamber door 146 can be pivoted opened and is thus axially displaced from the bearing end 152 of the rotor drum 132. Referring to FIG. 6, because the floating bushing 180 is retained by the bushing cavity 200 in the mounting bore 162, when the chamber door 146 is opened, the floating bushing 180 is also axially displaced from the bearing hub 170 and can slide off that component. The tapered interface between the tapered outer annular surface 174 of the bearing hub 170 and the tapered inner annular surface 182 of the floating bushing 180 can easily slide away from the line of contact and facilities disengagement. The chamber door 146 can thus be swung open as illustrated in FIG. 3 to provide access to the bearing end 152 of the rotor drum 132 allowing axial removal of the cutting rotor 130 from the rotor chamber 140.

In an embodiment, a second plurality of threaded pulling fasteners 222 may be inserted through the bushing cover plate 210 and into the floating bearing 180 to axially retract the floating bushing 180 against bushing cover plate 210 thereby collapsing the second set of cavity gaps 218. Forcibly retracting the floating bushing 180 against the bushing cover plate 210 by tightening of the second plurality of threaded pulling fasteners 220 may overcome friction between the interfaced tapered outer annular surface 174 of the bearing hub 170 and the tapered inner annular surface 182 of the floating bushing 180 such that the floating bushing is forcibly pulled from and drawn off of the bearing hub.

Figure 7:
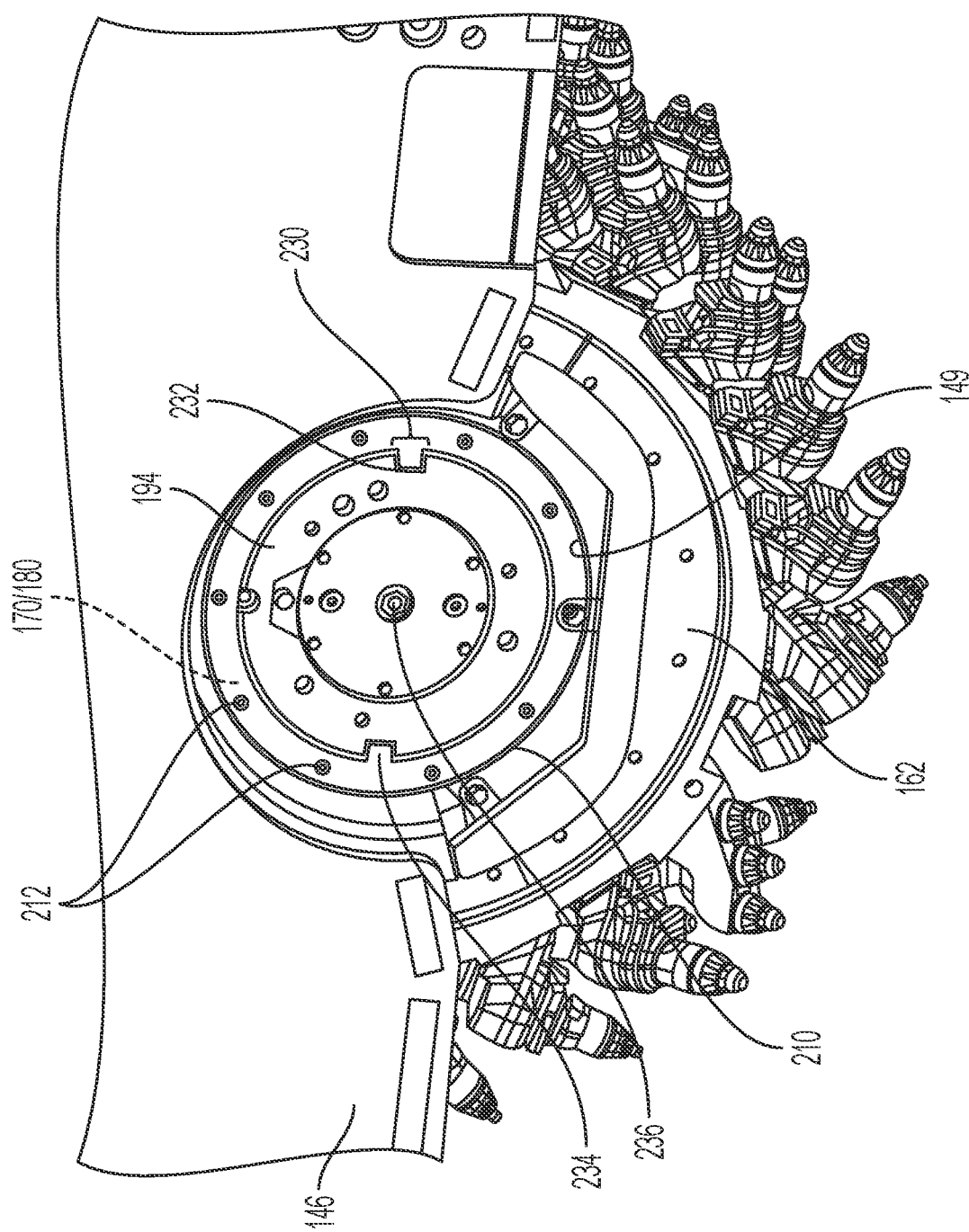
FIG. 7 is a perspective view of an embodiment of the drum bearing assembly that may include a rotational locking feature preventing rotation of the floating bushing and bearing hub when the cutting rotor rotates.

Referring to FIG. 7, there is illustrated an embodiment in which a rotational locking feature can lock particular components of the drum bearing assembly 156 together. When the drum bearing assembly 156 is assembled and the chamber door 146 is closed with respect to the chamber enclosure 142, the bearing hub 170 and the bushing 180 are brought into frictional contact with each other by their interfaced tapered surfaces. The bushing 180, which is locate axially outward of the bearing hub 170, may be partially exposed within the bearing bore 149 of the mounting boss 162 as illustrated. The bearing hub 170 as will be appreciated is disposed axially inward of the bushing 180 with respect to the drum rotational axis 136. The bearing hub 170 and the bushing 180 can be axially held in place in the bearing bore 149 by the bushing cover plate 210 that is mounted thereto.

The rotational locking features 230 may include one or more notches 232 disposed in the circumference of the exposed portion of the bushing 180 which may, for example, be the annular flange 194. The bushing cover plate 210 can include one or more complementary prongs 234 that may fit into the notches 232 of the bushing 180. When radially aligned, the prongs 234 can extend radially inward from the inner circumference of the bushing cover plate 210 and are received in the corresponding notches 232. The prongs 234 received in the notches 232 rotationally locks the bushing to the mounting boss 162 of the chamber door 146. This is due to the plurality of threaded fasteners 212 that mount the bushing cover plate 210 to the mounting boss 162 which rotationally locks those two components together. Engagement of the bushing 180 to the bushing cover plate 210 via the notches 232 and prongs 234 likewise rotationally locks the bushing such that it is prevented from rotating with rotor drum. Further, because the bearing hub 170 is frictionally locked to the bushing 180, the bearing hub is also rotationally locked with respect to the rotor drum.

An advantage of the foregoing disclosure is that the complementary tapered surfaces of the bearing hub and the bushing enable the components to connect with each other along a frictional line of contact whereby the bearing hub and bushing can be rotationally locked together and rotationally stationary with respect to the rotor drum. The complementary tapered surfaces further enable frictional contact between the components without the use of additional fasteners, thereby simplifying disassembly of the drum bearing assembly when removing and interchanging cutting rotors. The complementary tapered surfaces of the bearing hub and bushing also cause the other components of the drum bearing assembly to index into alignment with respect to the drum rotational axis. These and other advantages and feature of the disclosure should apparent form the forgoing detailed description and the accompanying drawings.

It will be appreciated that the foregoing description provides examples of the disclosed system and technique.

However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A mobile milling machine comprising:
   a machine frame supported on a plurality of propulsion devices for travel over a work surface in a travel direction, the machine frame defining a first lateral side and a second lateral side parallel with the travel direction;
   a cutting rotor rotatably supported by the machine frame for milling the work surface, the cutting rotor including a rotor drum that is cylindrical in shape and a plurality of cutting tools disposed exteriorly about the rotor drum, the rotor drum including a drum axle traversing between the first lateral side and the second lateral side of the machine frame and defining a drum rotational axis perpendicular to the travel direction, the drum axle terminating in a bearing end proximate the first lateral side of the machine frame; and
   a rotor chamber delineated by a chamber enclosure enclosing the cutting rotor, the chamber enclosure including a chamber door aligned with the first lateral side of the machine frame, the chamber door having a bearing bore disposed therein to partially receive the bearing end of the drum axle and form a drum bearing assembly therewith;
   the drum bearing assembly including a bearing hub disposed on the bearing end of the drum axle, the bearing hub including a tapered outer annular surface, and a bushing disposed in the bearing bore of the chamber door, the bushing including a tapered inner annular surface dimensioned to make a region of frictional contact with the tapered outer annular surface, the bearing hub and the bushing configured to make a sliding frictional interface with each other along complementary taper surfaces,
   wherein the bushing is a floating bushing retained in a bushing cavity disposed in the chamber door, and wherein the bushing cavity is disposed between a shoulder flange extending radially inward of the bearing bore and a bushing cover plate mounted to the chamber door,
   wherein the floating bushing has a bushing width and the bushing cavity has a cavity width, the bushing width and the cavity width measured in parallel with the drum rotational axis, the bushing width being dimensionally smaller than the cavity width to allow limited axial movement of the floating bushing within the bushing cavity.

2. The mobile milling machine of claim 1, wherein the bearing hub is fixedly mounted to an axle stem protruding with respect to the bearing end of the rotor drum.

3. The mobile milling machine of claim 2, wherein the bearing hub is frictionally fit to a rolling element bearing disposed on the axle stem.

4. The mobile milling machine of claim 1, wherein the shoulder flange has an inner flange diameter, the bushing cover plate has an inner plate diameter, and the bushing has an outer bushing diameter that is greater in dimension than the inner flange diameter and the inner plate diameter.

5. The mobile milling machine of claim 4, wherein the bushing cavity has a cavity periphery radially disposed around the drum rotational axis and the bushing has a cylindrical outer annular surface associated with the outer bushing diameter, the cavity periphery and the cylindrical outer annular surface facing opposite each other.

6. The mobile milling machine of claim 5, wherein the cavity periphery has an inner cavity diameter that is greater in dimension than the outer bushing diameter such that the floating bushing and the bushing cavity form a clearance fit allowing relative radial motion.

7. The mobile milling machine of claim 1, wherein the bearing hub and the bushing are concentrically indexed to the drum rotational axis when interfaced together.

8. A mobile milling machine comprising:
   a machine frame supported on a plurality of propulsion devices for travel over a work surface in a travel direction, the machine frame defining a first lateral side and a second lateral side parallel with the travel direction;
   a cutting rotor rotatably supported by the machine frame for milling the work surface, the cutting rotor including a rotor drum that is cylindrical in shape and a plurality of cutting tools disposed exteriorly about the rotor drum, the rotor drum including a drum axle traversing between the first lateral side and the second lateral side of the machine frame and defining a drum rotational axis perpendicular to the travel direction, the drum axle terminating in a bearing end proximate the first lateral side of the machine frame; and
   a rotor chamber delineated by a chamber enclosure enclosing the cutting rotor, the chamber enclosure including a chamber door aligned with the first lateral side of the machine frame, the chamber door having a bearing bore disposed therein to partially receive the bearing end of the drum axle and form a drum bearing assembly therewith;
   the drum bearing assembly including a bearing hub disposed on the bearing end of the drum axle and a floating bushing disposed in the bearing bore of the chamber door, the floating bushing retained in a bushing cavity disposed in the chamber door that allows limited axial movement of the floating bushing with respect to the drum rotational axis, wherein the bushing cavity is disposed between a shoulder flange extending radially inward of the bearing bore and a bushing cover plate mounted to the chamber door.

9. The mobile milling machine of claim 8, wherein the floating bushing has a bushing width between an inner axial bearing face and an outer axial bearing face, the bushing width dimensioned to provide a first cavity gap between the shoulder flange and the inner axial bearing face and a second cavity gap between the bushing cover plate and the outer axial bearing face.

10. The mobile milling machine of claim 8, wherein the bushing cavity has an inner cavity diameter that is greater in dimension than an outer bushing diameter of the floating bushing such that the floating bushing and the bushing cavity form a clearance fit allowing relative radial motion.

11. The mobile milling machine of claim 10, wherein the bushing cavity has a cavity periphery associated with the inner cavity diameter and the floating bushing has a cylindrical outer annular surface associated with the outer bushing diameter, the cavity periphery and the cylindrical outer annular surface facing opposite each other.

12. The mobile milling machine of claim 8, wherein the bearing hub and the floating bushing are configured to form a sliding frictional interface with each other along complementary tapered surfaces.

13. A drum bearing assembly releasably connecting a rotor drum having an axis to a chamber enclosure of a mobile milling machine, the drum bearing assembly comprising:

a chamber door of the chamber enclosure having a bearing bore disposed therein;

a floating bushing retained in a bushing cavity disposed in the chamber door and accessible to the bearing bore, the floating bushing constrained for limited movement in the bushing cavity along the axis;

a drum axle of the rotor drum defining a drum rotational axis, the drum axle including a bearing end configured to extend partially into the bearing bore of the chamber door; and a bearing hub disposed on the bearing end of the drum axle and configured to make a sliding frictional interface with the floating bushing along complementary tapered surfaces, wherein the floating bushing is axially spaced apart by a first cavity gap from a shoulder flange of the chamber door and is axially spaced apart by a second cavity gap from a bushing cover plate mounted to the chamber door.

14. The drum bearing assembly of claim 13, wherein the bearing hub includes a tapered outer annular surface and the floating bushing includes a tapered inner annular surface dimensioned to make a region of frictional contact with the tapered outer annular surface.

* * * * *